(12) United States Patent
Mace et al.

(10) Patent No.: US 7,730,148 B1
(45) Date of Patent: *Jun. 1, 2010

(54) BACKFILLING A LOCAL EMAIL ARCHIVE STORE

(75) Inventors: Donald Mace, Hopkinton, MA (US); Shawn Duarte, Amherst, NH (US); Kevin Derhak, Londonderry, NH (US)

(73) Assignee: EMC Corporation, Hopkinton, MA (US)

( * ) Notice: Subject to any disclaimer, the term of this patent is extended or adjusted under 35 U.S.C. 154(b) by 341 days.

This patent is subject to a terminal disclaimer.

(21) Appl. No.: 11/784,172

(22) Filed: Apr. 5, 2007

Related U.S. Application Data

(63) Continuation-in-part of application No. 11/731,608, filed on Mar. 30, 2007, and a continuation-in-part of application No. 11/731,609, filed on Mar. 30, 2007, and a continuation-in-part of application No. 11/731,331, filed on Mar. 30, 2007.

(51) Int. Cl.
*G06F 15/16* (2006.01)
(52) U.S. Cl. ........................ 709/206; 711/165; 711/170; 709/218; 709/219
(58) Field of Classification Search ................. 709/206, 709/218, 219; 711/165, 170
See application file for complete search history.

(56) References Cited

U.S. PATENT DOCUMENTS

| | | | |
|---|---|---|---|
| 5,890,163 A | 3/1999 | Todd | |
| 5,946,000 A | 8/1999 | Hoel | |
| 6,604,096 B1 | 8/2003 | Couch | |
| 6,629,138 B1 | 9/2003 | Lambert | |
| 7,069,573 B1 | 6/2006 | Brooks | |
| 7,222,156 B2 | 5/2007 | Gupta | |
| 7,243,298 B2 | 7/2007 | Yozell-Epstein | |
| 7,412,489 B2 | 8/2008 | Nowacki | |
| 7,523,222 B2 | 4/2009 | Carlson | |
| 7,539,709 B1 | 5/2009 | Vengerov | |
| 2002/0032623 A1 | 3/2002 | Wheeler | |
| 2003/0208608 A1 | 11/2003 | Merriam | |
| 2004/0221048 A1 | 11/2004 | Ogier | |
| 2004/0221295 A1 | 11/2004 | Kawai | |
| 2004/0225645 A1 | 11/2004 | Rowney | |
| 2005/0108435 A1 | 5/2005 | Nowacki | |
| 2006/0010213 A1 | 1/2006 | Mehta | |
| 2006/0010322 A1 | 1/2006 | Novack | |
| 2006/0031357 A1 | 2/2006 | Misra | |
| 2006/0101099 A1 | 5/2006 | Shaw | |
| 2007/0016648 A1 | 1/2007 | Higgins | |
| 2007/0061359 A1 | 3/2007 | Kilday | |
| 2007/0067399 A1* | 3/2007 | Kulkarni et al. | 709/206 |

(Continued)

OTHER PUBLICATIONS

Cemaphore Systems, "MailShadow 2.2, Disaster Recovery Done Right, Exchange Downtime: Not an Option," 2007, 2 pages, http://www.cemaphore.com/.

(Continued)

*Primary Examiner*—Wing F Chan
*Assistant Examiner*—Ruolei Zong
(74) *Attorney, Agent, or Firm*—Dergosits & Noah LLP

(57) ABSTRACT

An email archive system and associated techniques are described. Archived emails may be stored locally on a user's client computer in a local archive store. The email archive system and associated techniques may interact with an email message system and an email client application.

20 Claims, 9 Drawing Sheets

U.S. PATENT DOCUMENTS

| | | | |
|---|---|---|---|
| 2007/0078768 | A1 | 4/2007 | Dawson |
| 2007/0113035 | A1 | 5/2007 | DeVos |
| 2007/0130264 | A1 | 6/2007 | Walker |
| 2007/0168435 | A1 | 7/2007 | Moraca |
| 2007/0180033 | A1 | 8/2007 | Singh |
| 2007/0198797 | A1* | 8/2007 | Kavuri et al. ............... 711/165 |
| 2007/0250552 | A1* | 10/2007 | Lango et al. ............... 707/205 |
| 2008/0010350 | A1 | 1/2008 | Chen |
| 2008/0028028 | A1 | 1/2008 | Chismark |

OTHER PUBLICATIONS

Cemaphore Systems, "MailShadow: DR Done Right," 2007, 1 page, http://www.cemaphore.com/.

Microsoft Corporation, MSDN, "Sample Message Store," 2007, 1 page, http://msdn2.microsoft.com/en-us/library/ms530949.aspx.

Madhook, (Madshi.com), Home page, Jan. 30, 2006, 1 page, http://www.madshi.net/.

Madhook (Madshi.com), "madCodeHook," Product Description, Jan. 30, 2006, 1 page, http://www.madshi.net/madCodeHookDescription.htm.

Madhook, (Madshi.com), "madCodeHook," Product Description, printed Aug. 27, 2007, 1 page, http://help.madshi.net/madCodeHook.htm.

Symantec Systems, "Symantec Enterprise Vault: Agents & Options," Product Description, 2007, 1 page, http://www.symantec.com/enterprise/products/agents_options_details.jsp?pcid=2244&pvid=332_1&aoid=322_offline_vault&tid=agents.

Symantec Systems, "Data Sheet: Data and System Protection, Symantec Enterprise Vault," Product Description, 2007, 3 pages, http://www.symantec.com/enterprise/products/agents_options_details.jsp?pcid=2244&pvid=322_1&aoid=322_offline_vault&tid=agents.

* cited by examiner

BACKFILLING A LOCAL EMAIL ARCHIVE STORE

RELATED APPLICATIONS

This application is a continuation-in-part (CIP) of U.S. application Ser. No. 11/731,608 entitled "DISPLAY OF ARCHIVED EMAIL CONTENT IN A PREVIEW PANE," filed on Mar. 30, 2007, and a continuation-in-part (CIP) of U.S. application Ser. No. 11/731,609 entitled "LOCAL EMAIL ARCHIVE STORE SIZE MANAGEMENT," filed on Mar. 30, 2007, and a continuation-in-part (CIP) of U.S. application Ser. No. 11/731,331 entitled "CHANGE OF AN ARCHIVED EMAIL PROPERTY IN THE EMAIL SYSTEM LOCAL STORE," filed on Mar. 30, 2007, each of which is incorporated herein by reference in its entirety.

BACKGROUND

1. Technical Field

The techniques described herein relate in general to email, and in particular to archival of emails.

2. Discussion of Related Art

Email archive systems are known that archive emails from an email system to reduce the storage requirements for the email system.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
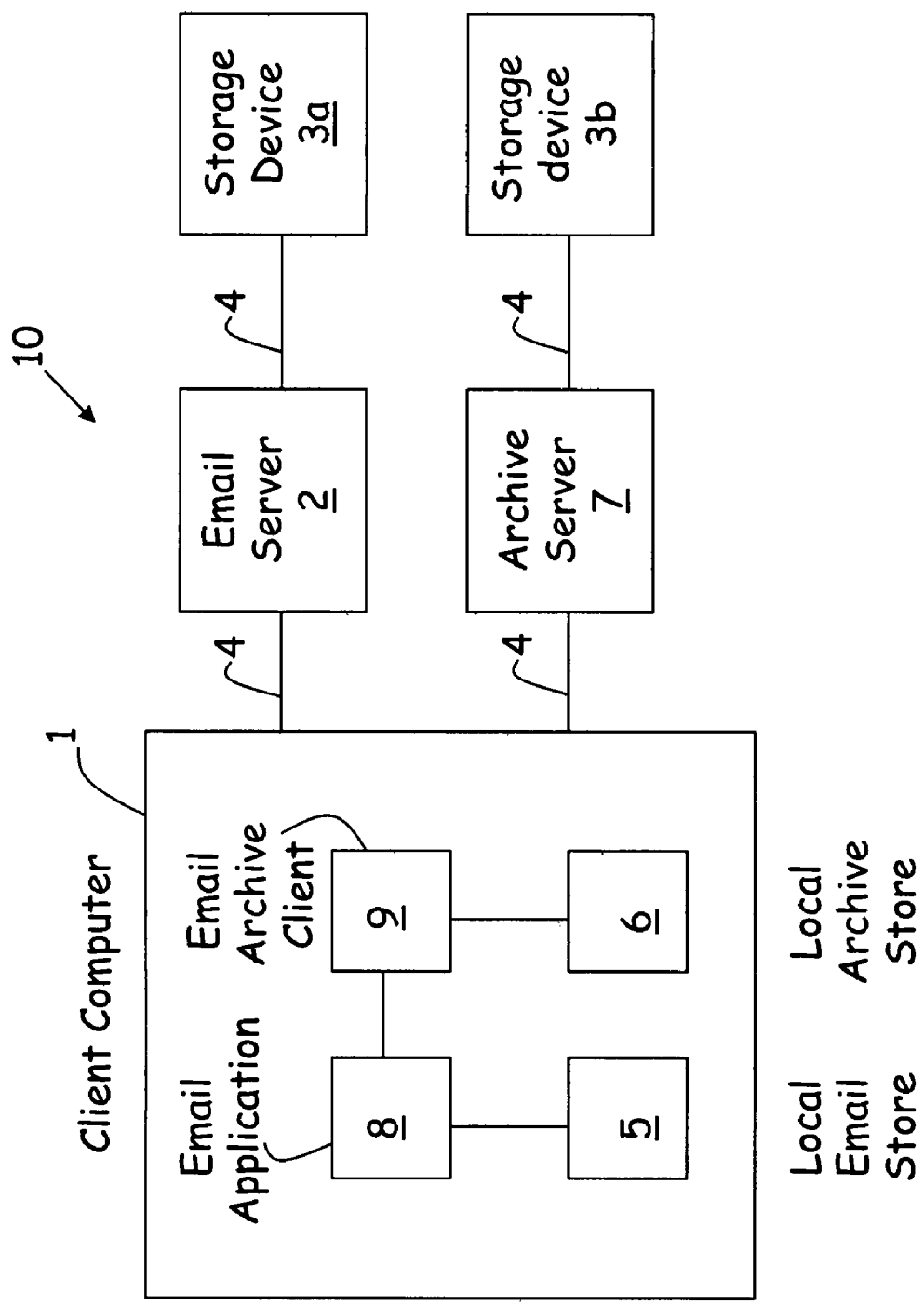
FIG. 1 is a block diagram illustrating an exemplary computer system including an email system and an email archive system, on which the techniques described herein may be implemented.

Applicants have appreciated that prior email archive systems can be improved upon in numerous ways. For example, prior email archive systems did not support certain email features that email systems provide, so that such features cannot be properly maintained for archived emails. Some of the techniques described herein enable an email archive system to support email system features previously unsupported by email archive systems (e.g., illustrating archived content in a preview pane of the email system and allowing a user to add or modify properties for an archived email). As a result, the user experience for archived emails is improved.

Also, prior email archive systems often took a significant amount of time to retrieve archived emails. In addition, Applicants have identified numerous ways in which the performance of an email archive system can be improved. Each of these techniques is described in detail below.

Emails are electronic messages of any type. They can include text, images and/or any other type of content. To send and receive emails, a user typically employs an email message system having a client/server architecture in which client computers communicate with a server computer over a network. In a typical client/server network architecture, functions may be divided between client applications that run on users' client computers and the server which responds to requests from the client applications. Client applications typically provide a graphical user interface that a user can view and manipulate. An email message system typically comprises an email message server that may manage email for a plurality of users, and an email message client that executes on a user's computer and provides a user interface for the user to send and receive emails. In this respect, an email message system typically supports the creation of user email accounts, and a user establishes an email account to send and receive email messages. Examples of email message systems include the OUTLOOK® email and collaboration client/MICROSOFT® Exchange email message service provided by Microsoft Corporation of Redmond, Wash. and the LOTUS NOTES® email client/DOMINO® email message service available from IBM Corporation. Some email systems also provide other email features, such as email-related reminders, email integration with an electronic calendar, color-flagged emails, etc.

Email has become a common and accepted method of communicating. As a consequence, it is not uncommon for a single user's email account to contain thousands of messages. Some of these messages may include significant amounts of data, such as large attachments. Managing the large number and high data storage requirements for emails can place a strain on network resources such as email servers and storage systems. In particular, the servers for many email systems are storage intensive and typically demand relatively high-performance storage resources to provide the desired user experience, which can result in expensive storage requirements for many email systems.

Email archive systems have been developed to reduce the costs associated with managing and storing emails. Archiving emails can reduce the storage resources needed for implementing an effective email system by offloading some of the emails on the system to less expensive storage. For example, one common technique used by email archive systems is to archive relatively old messages, based on the assumption that a user is less likely to view older emails than more recent emails so that any performance hit in retrieving messages from archive storage does not occur frequently enough to significantly degrade the user's experience.

Email archive systems typically are integrated with an email system (e.g., via the email client application) such that the email client application provides an indication to a user that an email has been archived, allowing the user to distinguish between archived and non-archived emails. For example, some email archive systems have an icon associated with each email in the email client which may differentiate between messages that are archived and those that are not. Emails that are not archived may be represented by one type of icon and emails that are archived may be represented by a different type of icon. An email (or portion thereof such as an attachment) that has been archived may be replaced on the email system by a "short-cut" identifier (also known as a "stub") that can be used to retrieve the email from the archive. The term "short-cut" is sometimes used to refer to the fact that an email has been archived and that at least a portion of its content has been removed from the email message system (e.g., the client application email store).

Emails that are archived may be stored in a separate storage unit from emails that are not archived (e.g., storage units managed by the archive system rather than the email system). In prior email archive systems, archived emails typically were stored remotely in slower and less expensive storage devices than were used by the email system to store non-archived emails. One disadvantage of this type of email archive system is that it can reduce the quality of the user's experience when the user attempts to read an archived email, because it can take longer to retrieve an archived email stored in slower data storage than it can to retrieve emails resident on the email system. Such a delay can be perceived as a significant decrease in performance from what users are accustomed to for opening non-archived emails, which can appear to open nearly instantaneously.

It should further be appreciated that when archived emails are stored only on a remote archive server, access to those emails requires that the email client application be operating in an online mode with network connectivity to the email archive server. Thus, a user working in a local mode with an email application may be unable to access any archived emails.

Attempts have been made to address some of the disadvantages of email archive systems by employing a local store for the email archive system on the client computer. Storing archived emails locally on a user's client computer may reduce the amount of time it takes to retrieve archived emails, and enable the user to access any archived emails in the local store even when offline (i.e., even if lacking connectivity to the archive server).

While providing a local store for the email archive system can provide a number of advantages, Applicants have appreciated that existing email archive systems that employ a local store can be improved upon in numerous ways described below. Thus, in some embodiments of the present invention, an improved email archive system is provided that employs a local email archive store. A user request for an archived email may be intercepted locally on the user's client computer, and the email may be provided from the local archive store on the user's device if the archived email is available in the local archive store. Storing emails locally on the user's client computer may be less expensive than some other forms of email storage, such as remote "tier 1" storage commonly used by an email system server to store non-archived emails for a user's account. Thus, from a cost perspective, relatively large volumes of a local storage medium (e.g., a hard disc in a user's computer such as a laptop or other personal computer) can be provided relatively inexpensively as a local archive store, which may be advantageous in that the larger the local archive store, the higher the "hit" rate for emails that a user accesses being available in the local archive store.

Several email archiving techniques are described in further detail below in sections I-VIII. The techniques described herein may be implemented on any type of computing system. An illustrative computing system 10 illustrated in FIG. 1. However, it should be appreciated that the techniques described herein are not limited to being implemented on computing system 10, as they may be implemented on any suitable computing system.

The illustrative computing system 10 comprises both an email system and an email archive system, both of which include components distributed amongst a number of computing devices. In particular, the system includes a client computer 1 that has an email client application 8 executing thereon. As discussed above, the email system also includes a local email store 5 that stores local copies of the emails in an email account for a user of the client computer 1. The email storage system further includes an email server 2 that stores emails on a storage device 3a. The storage device 3a for the email system may be a "tier 1" storage system of the type used conventionally in email systems. However, the techniques described herein can be implemented with email systems of any type, and are not limited to the configuration of the email system or the types of storage devices used thereby. It should be appreciated that the email server 2 may store emails for a number of users in addition to user of the client computer 1. For example, the email server 2 may be an email server for an organization or an enterprise (e.g., a business) and may store the emails for all individuals in the enterprise.

The illustrative computing system 10 also includes an email archive system that includes an email archive module or client 9 that resides on the client computer 1. In accordance with some techniques described herein, the email archive system further includes a local email archive store 6 to store locally at least some of the emails for the email account of the user of the client computer 1 that have been archived from the email system. The email archive system further includes a storage device 3b to store the emails archived by the email archive server 7. As discussed above, it is contemplated that the storage device 3b may employ less expensive storage than the storage device 3a employed by the email system, but the techniques described herein are not limited in this respect, and can be used with any email archive system that stores archived emails on any type of storage device, including the same type (or even devices) as the storage device 3a used by the email system.

The computing devices 1, 2, 7, 3a and 3b in FIG. 1 are all shown as being interconnected by various communication media 4. In one illustrative implementation, these communication media can be network connections of any type, and are referred to below as network connections. However, it should be appreciated that the techniques described herein are not limited in any respect by the ways in which various computing devices in the system communicate with each other.

A user may use client computer 1 to perform email-related functions using the email client application 8, which may display a user interface suitable for the user to perform email-related functions, such as reading and composing emails. For example, email client application 8 may be a software application that executes on client computer 1 and enables a user to perform a variety of email functions such as sending, receiving, composing, editing, searching for and/or organizing emails. Email client application 8 may also be capable of performing other email-related functions such as displaying reminders, color flagging of emails, providing integration with a calendar module, and/or any other functions, as the techniques described herein are not limited to use with email systems having any particular capabilities.

Email server 2 may manage the distribution of emails as part of an email message system that includes at least client computer 1, email server 2 and email storage system 3. Email client application 8 may send and receive emails to/from email server 2 via a suitable network connection 4 between client computer 1 and email server 2. Email server 2 may communicate with email storage system 3 to store and retrieve emails for one or more user email accounts on one or more client computers.

As part of the management of non-archived emails in the email message system, email client application 8 may store non-archived emails locally on client computer 1 in client application email store 5. When the user opens a non-archived email, the contents of the email may be retrieved from client application email store 5 and displayed using the email client application. As a further management function for non-archived emails, emails stored in client application email store 5 may be synchronized from time to time with the messages in a user account on the email server 2. For example, the email client application 8 may synchronize the content of client application email store 5 with the emails stored in the user's account (e.g., in email storage system 3 via the email server 2).

At least some of the emails in the email message system may be archived in accordance with an email archive system policy enforced by the email archive system. Any suitable policies may be implemented for determining which emails are to be archived, as the techniques described herein are not limited in this respect. For example, emails that exceed a certain age and/or a certain size may be archived by the email archive system. The email archive system policy may be selected by a network administrator, and implemented at least partially using email archive module 9. Emails (or portions thereof, e.g., attachments) that are archived may be at least partially removed from client application email store 5. In place of the full email, client application email store 5 may store a "stub" or "short-cut identifier" for emails that have been archived. A "stub" or "short-cut identifier" includes limited information about the email, such as the identity of the sender, identity of the recipient, and/or other limited information. The terms "stub" and "short-cut identifier" are used interchangeably herein. A stub does not include the full contents of the email or an attachment associated with the email, and thus requires less storage space. To obtain the full email contents and/or attachment(s), the archived email must be retrieved. In one embodiment, the information in the short-cut identifier can be sufficient to identify to the user the general nature of the email and/or can include sufficient information to uniquely identify the email so that it can be retrieved from the archive. However, it should be appreciated that the techniques described herein are not limited to forming a stub or short-cut identifier in any particular way.

In some embodiments, at least some archived emails and/or attachments are stored locally on client computer 1 in a local email archive store 6. If a user opens an archived email in the local store, the full email may be retrieved from local email archive store 6 and displayed for the user in the email client application. Storing archived emails and/or attachments locally on client computer 1 can reduce the amount of time needed to provide the archived email content to a user.

Figure 2:
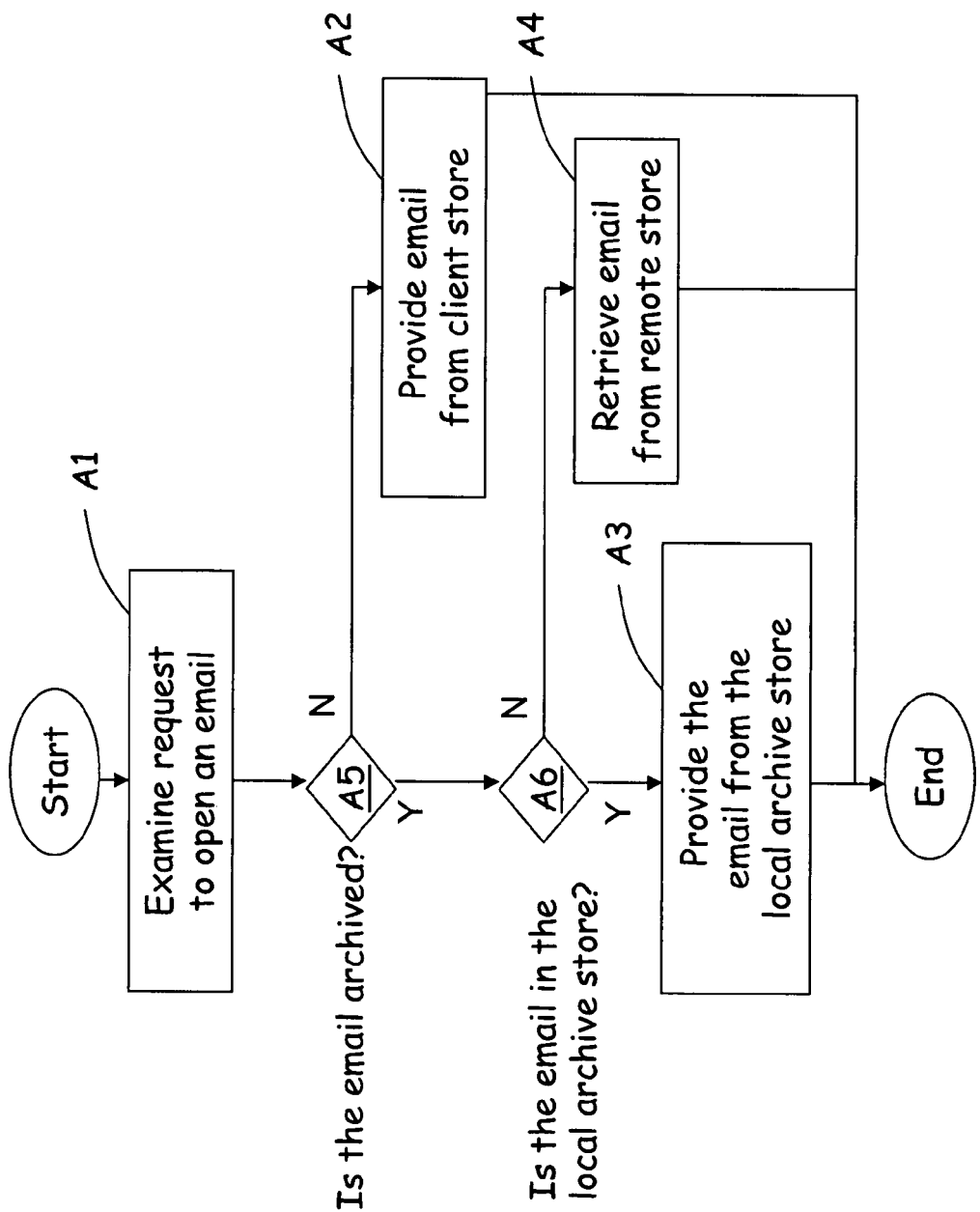
FIG. 2 is a flow chart of a method of providing an archived email to a user, according to one embodiment.

FIG. 2 is a flowchart illustrating a method of providing email content to a user (e.g., displaying, making available for printing, copying, forwarding, etc.), according to some embodiments. When a user selects or opens an email, email archive module or client 9 may examine this call at A1 and check (at A5) to see whether the email is archived. If it is not an archived email, the email client application 8 may retrieve the email from client application email store 5 and profile it to the user at A2. If the email has been archived, the email archive module 9 may check (at A6) to see if the content of the email has been stored locally in local email archive store 6. If so, the email is retrieved from local email archive store 6 at A3, provided to the user and the process ends. However, if it is determined at A6 that the content of the email has not been stored locally in archive email store 6, the email archive module 9 may retrieve (in A4) the email from storage system 3b by sending a request to archive email server 7, provide the email to the user and the process ends. Archived emails retrieved via the archive email server may be provided to user in any way. For example, the email may be re-stored directly to the local email store, be provided to the local archive store 6 from where it can be retrieved and provided to the user, or the email may be provided directly to the email application 8 local email archive store 6 via email archive server 7. Techniques for retrieving archived emails are discussed in further detail below.

As discussed above, although one illustrative computing system 10 has been described with respect to FIG. 1, it should be appreciated that the techniques described herein are not limited to being performed using the particular system described above. For example, the functional components of computing system 10 may be implemented using any suitable hardware and/or software. Client computer 1 may be any suitable client computer capable of sending and receiving emails and interacting with a user, such as a computer, a personal digital assistant (PDA) or cellular telephone, for example. Email server 2 and email archive server 7 each may be any suitable computing device capable of performing the described functions. Email server 2 and email archive server 7 each may be implemented on a single computer dedicated to performing the described functions for the server, may be distributed among a plurality of dedicated computers, or may be implemented on one or more competing devices that also perform other functions. For example, the email server 2 and the archive email server 7 may execute on the same one or more computers. Although, only a single client computer 1 is shown in FIG. 1, the email server 2 and/or the email archive server 7 may support a plurality of client computers.

As discussed above, each of storage device 3A used by the email system and storage device 3B used by the email archive system can be any type of suitable storage device. As discussed above, in one embodiment, it is contemplated that the storage device 3B will be a less-expensive type of storage than is used for the storage device 3a for the email system, but it should be appreciated that the techniques described herein are not limited in this respect, and can be deployed with computer systems that use any type of storage for either the email system or the email archive system, including systems that employ the same type of storage for both.

Email client application 8 may be any suitable email client application. Client application email store 5 may be any suitable type of storage, for example, the client application email store 5 (also referred to as a local email store) may be managed in any way by the email client application 8 and may be stored on any storage medium within or accessible to the client computer 1. For example, when the email client application is the OUTLOOK® email and collaboration client, the local email store may be the .OST file.

Email archive module 9 (also referred to as an email archive client) may be any software module configured to interface with the email client application 8 for providing archival of emails and other associated functions, as discussed in further detail below. For those devices that communicate over one or more network connections 4 as illustrated FIG. 1, any suitable wired or wireless network may be used, examples of which include a local area network, wide area network, the Internet, and a cellular network. These are described only by way of example, as any suitable communication medium can be employed.

The following sections I-VIII describe several techniques that Applicants have developed related to email archive systems. It should be appreciated that the techniques described herein each may be used separately, all be used together or may be used together in any combination of two or more techniques.

I. Display of Archived Email Content in a Preview Pane

Conventional email archive systems did not enable an email system to provide certain features and capabilities for archived emails that are available for non-archived emails. For example, because of technical restrictions based on the way in which they are implemented, previous email archive systems did not allow the user to view the archived content of archived emails in the preview pane of the email client. Information that was not stored in the email "stub" could not be displayed. Applicants have developed an email archive system and associated techniques that enable viewing the archived content of archived emails in the preview pane, according to some embodiments.

Email client applications have a user interface that includes a selection interface showing a list of the user's emails. For example, the user's emails may be displayed as a list that is organized according to the order in which the emails are received, by sender, or other criteria (e.g., subject). To read an email, the user can "open" an email by double clicking on the portion of the selection interface at which the selected email is displayed, for example. Each time an email is opened, the content of the email is obtained and the email client application opens a new window to display the email content. Thus, if a user opens several emails, several windows will be opened to display each email separately. Opening each email in a separate window can be cumbersome because the user will later have to close each message to prevent a large number of windows from being open and cluttering the screen.

Figure 3:
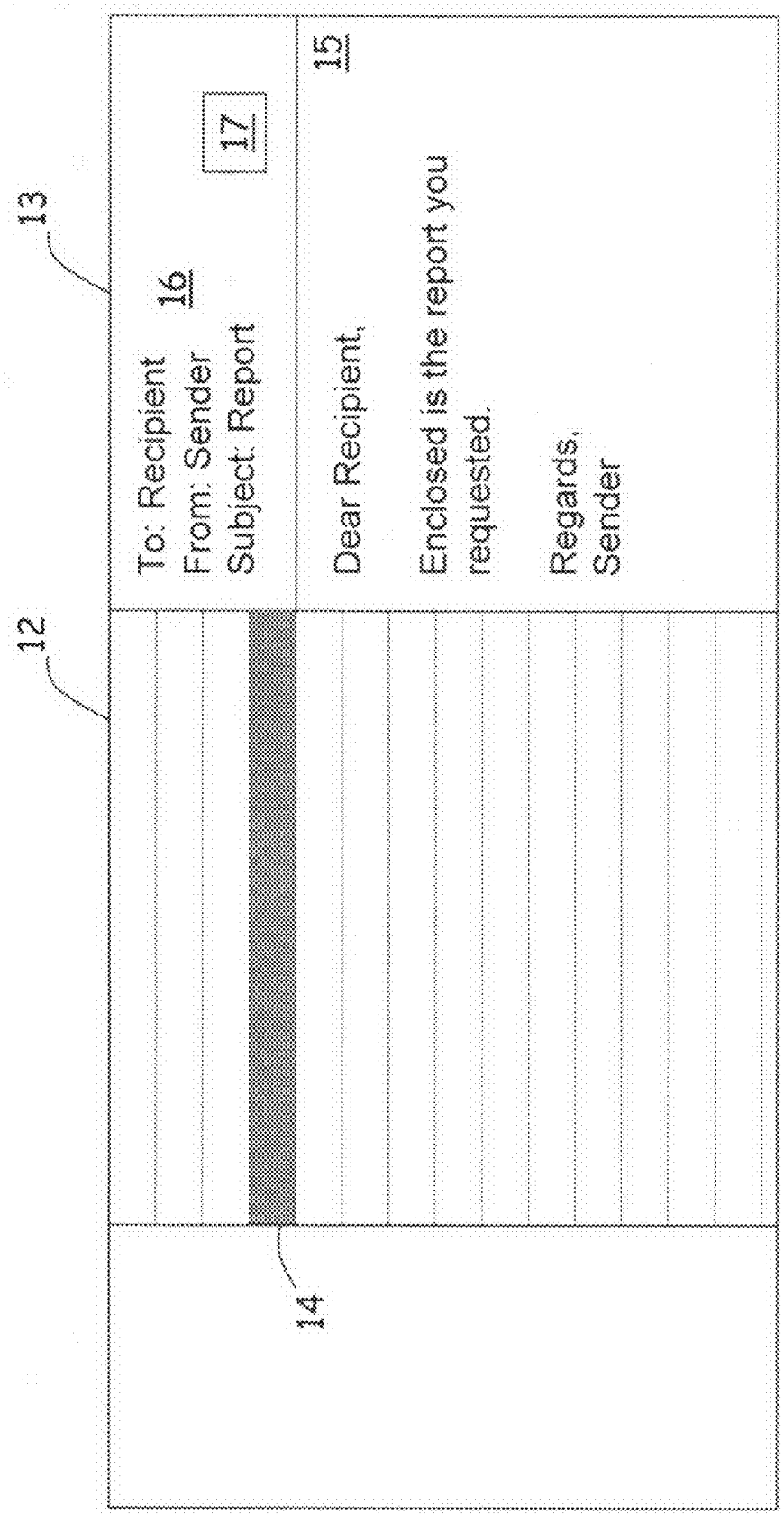
FIG. 3 is a diagram illustrating a selection interface and a preview pane displaying the contents of an archived email, according to another embodiment.

Thus, some email client applications provide another way for a user to read the contents of an email, i.e., the preview pane. The preview pane enables the user see the contents of an email without having to actually open the email. The preview pane is a user interface that may be displayed at the same time as the selection interface so that a user can view both interfaces at the same time. As illustrated in FIG. 3, when the user selects an email in the selection interface, the preview pane may automatically display the contents of the selected email. An email may be selected by single clicking on a message in the selection interface, for example. Some email client applications allow a user to quickly cycle through multiple emails by pressing the "down" or "up" keys on the keyboard to select different messages in the selection interface. Using the preview pane can save the user time in viewing an a email.

FIG. 3 illustrates a an example of a selection interface 12 and a preview pane 13 as they may appear when displayed by an email client application (e.g., email client application 8). When a user selects email 14 in the selection interface 12, the contents 15 of email 14 are obtained and displayed in preview pane 13. With conventional email archive systems, if email 14 were archived, the preview pane would not be able to display the archived contents 15 of email 14 upon being selected by the user. Rather, the email client application could only display information from the email's "stub" stored in the client application email store 5. The email stub may contain only limited information about the email, such as the sender, recipient, subject, etc., but less than the full content of the email. Such email stub information may be displayed in the email header 16 in the preview pane, for example. In some circumstances, the email stub may contain a certain amount of text that can be displayed in the preview pane. However, the email stub does not contain the full contents of the email, and thus the preview pane could not display the full contents of archived emails on prior email archive systems. In some circumstances, viewing the full contents of the email on prior email archive systems required the user to open the message, which caused the preview pane function to be less useful for some archived emails. For example, if the full archived email contained a large amount of data such as an image and/or an attachment, some of the email contents may not be stored in the email stub, and such an email would not be displayed properly in the preview pane. In one aspect of the techniques described herein, the preview pane may properly display the contents 15 of an archived email when the email is selected (e.g., using the selection interface). For example, the preview pane may display the email as it would appear to a user when the email is opened. Accordingly, the user experience for archived emails is improved by enabling enhanced preview pane functionality for archived emails.

One way to display the content of archived emails in the preview pane is to make the content of archived messages available to the email client upon the selection of an email in the selection interface. Typical email client applications do not provide a software interface allowing an email archive system to easily identify the selection of an email. Applicants have developed a technique to identify selection of an email, and in one embodiment leverage that technique to enable the content of archived emails to be displayed in the preview pane. In one aspect, this technique is implemented by software that intercepts a function call from the email system to an email application programming interface, such as a MAPI (Mail Application Programming Interface), to provide this functionality. MAPI is a standardized set of email-related functions designed for the WINDOWS® operating system available from Microsoft Corporation. MAPI functions are organized into several function libraries, also known as .DLL files. When performing an email related function, such as retrieving an email from the local store, the email client application can call one or more MAPI functions from the appropriate MAPI function library.

As one example, upon selection of an email in the selection interface, the email client application may call a MAPI function to retrieve the selected email from the local store to display the email in the preview pane. In some embodiments, this function call may be intercepted to determine if the email is archived in the local email archive store. If the email is archived in the local email archives store, the call may be passed to an email archive module function to service the request from the local archive store. Thus, in one aspect, email functions have been developed that may take the place of MAPI functions for archived emails. Although some of the techniques described herein relate to intercepting a MAPI function call, the techniques described herein are not limited to intercepting a MAPI function call, as any type of function call may be intercepted.

Figure 4:
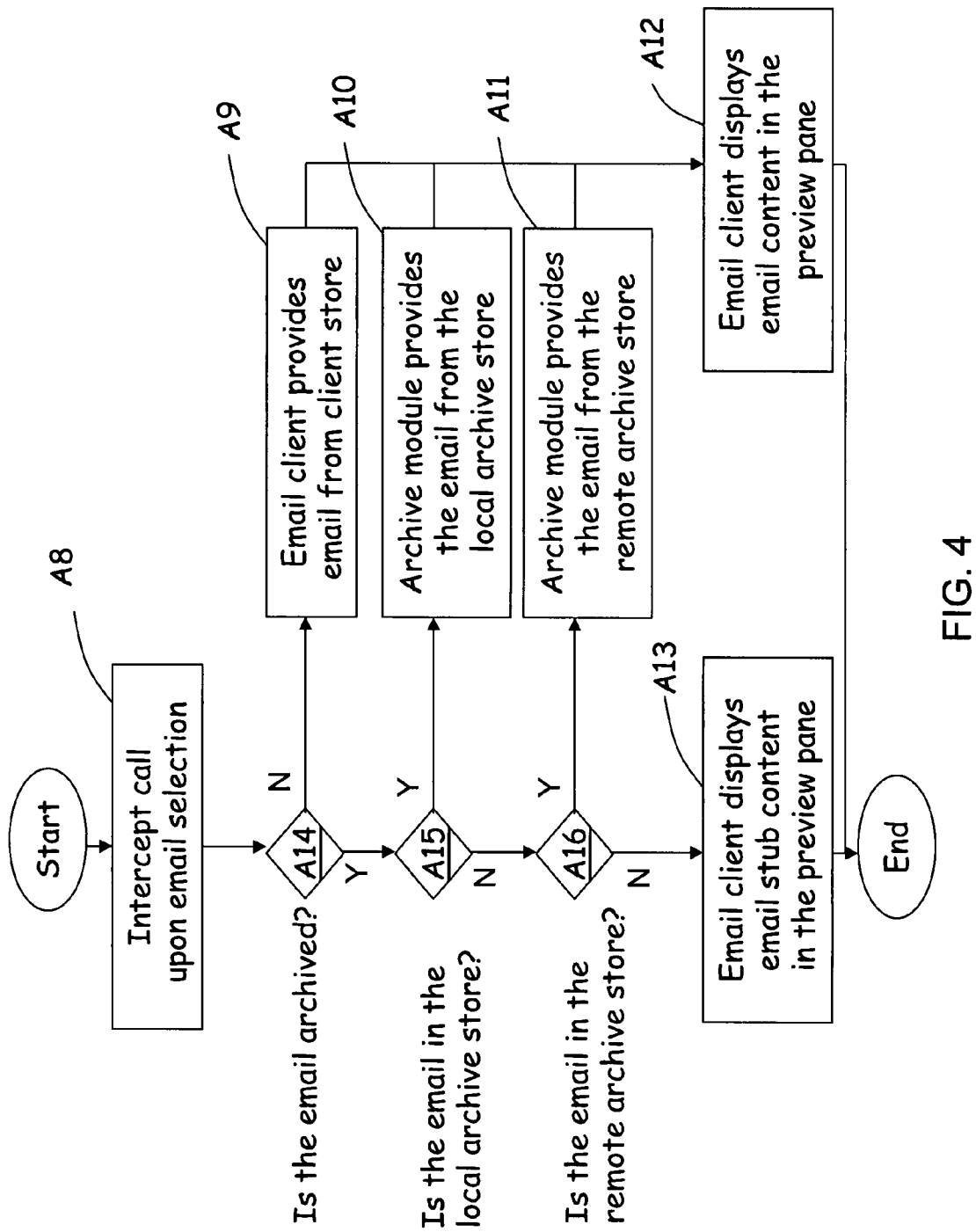
FIG. 4 is a flow chart of a method for displaying the contents of an archived email in the preview pane, according to another embodiment.

FIG. 4 is a flowchart illustrating a method of displaying archived content in the preview pane, according to some embodiments. In one aspect, the selection of a message in the selection interface may be detected by intercepting an operating system level function call (e.g., a MAPI call) from the email system that occurs upon the selection of an email (e.g., in the selection interface) in A8.

The email archive system may be designed to check emails when selected (at A14) to determine if they are archived, and if so, to obtain their content for display in the preview pane. This determination can be made in any suitable way. In some embodiments, the MAPI call may be intercepted by email archive module 9, which then may determine (A14) whether or not the email identified in the call is archived by checking the content for the email in client application email store 5. In one embodiment, the selection may be detected by intercepting a call to a MAPI function (such as, for example, the MSProviderInit function, which is the entry point to the EMSMdb32.dll MAPI provider function library). By checking the local email store 5, the email archive system can determine whether it includes the full email or a stub for an archived email. If it is determined (A9) that the call indicates selection of a non-archived message, the call may be passed to the called MAPI function, which may provide the content to the email client in its typical manner. The email client may then display the content in the preview pane (A12).

If the call indicates selection of an archived message, the call may be redirected to a different function, such as an entry function to a "replacement" function library designed to take the place of the MAPI provider function library for archived emails. The replacement function library may perform similar functions as the MAPI function library, but may be configured to interface with email archive module 9 and to access local email archive store 6. After the function call has been intercepted, it may then be determined (A15) whether the message can be retrieved from the local email archive store. This determination may be done in any suitable way. For example, email archive module 9 (FIG. 1) may check local email archive store 6 to determine whether or not local email archive store 6 contains the contents of the email. If it is determined that the message can be retrieved from the local email archive store 6, the message may be retrieved from local email archive store 6 (A10), and the contents of the message may be provided to the email client so that it may be displayed in the preview pane (A12).

If it is determined that the selected message can not be retrieved from archive email store 6, it may be determined (A16) whether the message can be retrieved from the remote email archive store. For example, email archive module 9 may direct client computer 1 to send a request to email archive server 7 to retrieve the archived content. If network connectivity is available (e.g., if the user is not working in portable mode), the archived email may be retrieved and provided to the email client in A11. The contents of the message may then be displayed in the preview pane in act A12.

In some embodiments, the retrieval of the email from the email archive server may be performed using a SOAP (Simple Object Access Protocol) request. The archive email server may respond to client computer 1 by sending a reply that includes a SOAP attachment containing the email and its contents, or an indication that the requested email is not available in archive system if it is unavailable for any reason. It should be appreciated that the description of communicating with the local archive store 6 and the email archive server using SOAP is provided merely for illustrative purposes, and that other types of communication techniques can be employed.

If it is determined that the archived message content is not available from either the local archive store or the networked storage unit, the archived contents of the message are not returned to the email client and are not displayed in the preview pane. Instead of displaying the archived content of the archived email, the information available on the email stub may be displayed (A13).

Some archived emails may have one or more attachments. Prior email archive systems did not enable the preview pane to display the one or more attachments associated with an archived email. In some embodiments, the one or more attachments associated with an archived email are displayed in the preview pane as one or more attachment icons 17, as illustrated in FIG. 3. In one aspect, the attachment icon may be a visual representation of the attachment's file type. If the user wishes to open the attachment, the user may do so via the preview pane. For example, the user may "double click" on attachment icon 17 to open the associated attachment. Some archived emails may include inline attachments such information about images or other visual effects that are intended to be displayed in the body of the email when opened. In some embodiments, the image or visual effect may displayed in the preview pane when the email is selected by the user. Any suitable image may be displayed, including a moving image such as video. As another example, some archived emails may include audio information, such as a telephone message. When such an archive email is selected, the preview pane may display an audio interface that allows the user to listen to the audio information by manipulating the audio interface. For example, the audio interface may include buttons such as "play," "stop," "rewind" etc. that the user may select in the preview pane to play the audio content of the email. As a further example, the email may include a combination of two or more different types of content, such as video and audio.

It should be appreciated that the embodiments described herein that enables viewing the content of archived emails in the preview pane of an email client is not limited to the specific implementation techniques described above as alternative implementations are possible.

II. Local Email Archive Store Size Management

Applicants have appreciated that different users may have different requirements for email storage, different requirements for archival of emails, and different local storage resources to be allocated to a local email archive store. In some circumstances, it may be desirable to archive a relatively large number of emails to reduce the cost of email storage. However, some users may require a higher level of email availability, and may wish to archive a relatively small number of emails. Another factor in determining the amount of emails to archive is the amount of storage space (e.g., hard disk space) available on the user's device for local email storage, as some devices may have more space available for email storage than others. Relatively small devices such as cellular telephones, personal digital assistants (PDAs) and portable computers may not have as much data storage space as other devices, such as a desktop computer.

Applicants have appreciated that it may be desirable to allow a user to control the size of the local email archive store to suit the user's requirements. Thus, one embodiment makes the size of the local email archive store (e.g., local store 6 in FIG. 2) configurable by the user. Accordingly, the user may adjust the maximum size of the local email archive store 6 to suit the user's needs. For example, if the user desires to have quick access to archived emails, or if the user is planning to enter a portable mode wherein the email archive server may be unavailable, the maximum size of the local email archive store 6 may be increased by the user to increase the number of archived emails stored locally. Alternatively, if the user does not have a significant amount of disk space available, the user may choose to reduce the amount of storage space allocated to the local email archive store 6. In some embodiments, the user may change one or more parameters of the local email archive store 6 using a user interface configured to allow the user to adjust the one or more parameters of local email archive store 6. In some embodiments, the user may change the maximum allowed size of the local archive store and/or one or more criteria used for determining whether or not an archived email is to be included in the local archive store.

As one example, the user may access a local archive configuration interface to configure a parameter of the local archive store. The local archive configuration interface may be accessed by the user via a user interface provided by the email archive system, or in any other suitable way. The local archive configuration interface may display a visual indication of the current size of the local archive store, for example, and/or one or more user interface components that the user may interact with to change a parameter of the local email archive store, such as the maximum size of the local email archive store. In some embodiments, the local archive configuration interface may be implemented by email archive module 9 and may be integrated with the email client application 8 so that the interface may be presented by the email system.

When email archive module 9 receives an indication that a parameter of the local email store has been changed, email archive module 9 may manage the emails that are stored in local email archive store 6 accordingly. For example, the storage of emails in the local email archive store may be managed so that the amount of storage used by the local email archive store does not exceed a chosen maximum size. Any suitable criteria may be applied to select the archived emails to stay within the specified size.

As another example, the storage of emails in the local email archive store may be managed to indirectly impact the size of local archive store by controlling the selection criteria for emails in the local store. For example, the emails in the local archive store may match one or more selection criteria, such as email message size, the age of the email, the date on which the email was received, the presence and/or size of an attachment, the time at which the email was added to the local archive store, the time at which the email was most recently accessed, and other any other suitable criteria. Emails that do not match these criteria may not be retained in the local archive store and may be purged from the local email archive store if already stored therein. Emails may be purged form the local archive store in response to the user changing one or more parameters of the local email archive store, such as directly reducing the size of the local email archive store or changing a selection parameter. If the size of the local email archive store is reduced indirectly by the user, the email archive system may change the one or more criteria used to determine which emails should be stored in the local email archive store so that the size of the local email archive store is reduced. For example, the email archive system may reduce the amount of time that an email is stored in the local email archive store. However, it should be appreciated that any suitable parameter may be changed to effect a change in the user defined size of the local email archive store. In some circumstances, the size of the local email archive store may be increased, or the criteria for the local archive store relaxed. In response, the email archive system may take steps to backfill the local email archive store with emails that match the appropriate criteria, as discussed below in Section IV.

Figure 5A:
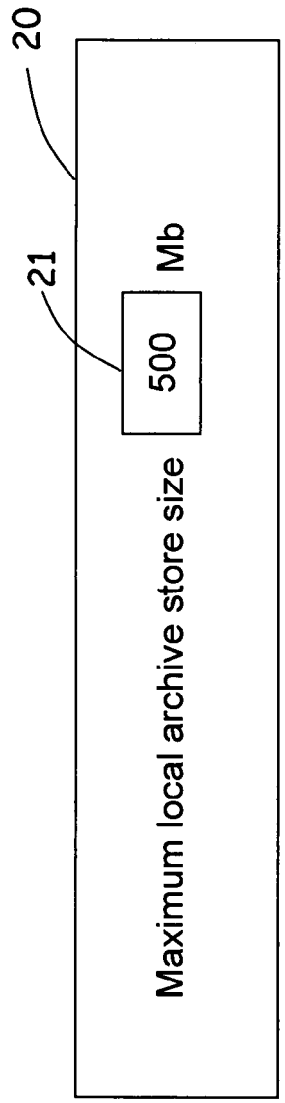
FIGS. 5A, 5B and 5C illustrate examples of user interfaces for changing the size of a local email archive store and a retention time for the local email archive store, according to other embodiments.
Figure 5B:
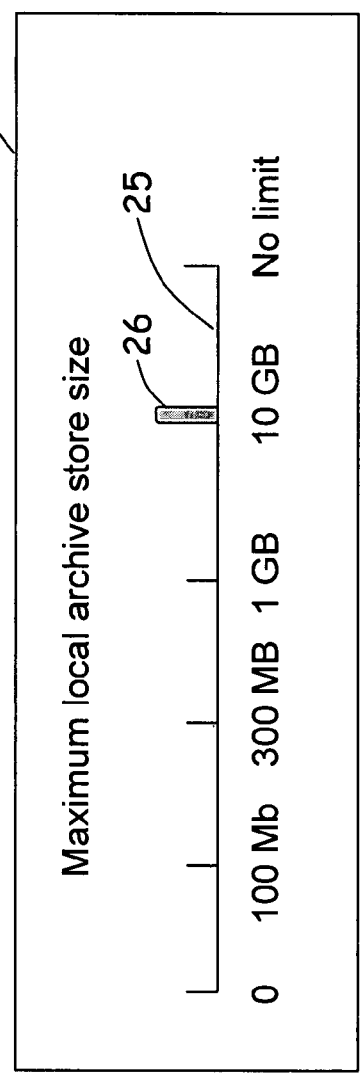
Figure 5C:
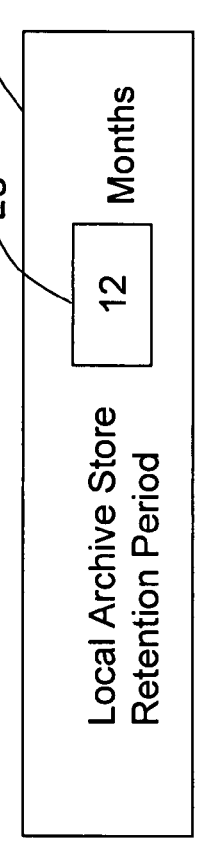

FIGS. 5A, 5B and 5C illustrate three examples of local archive configuration interfaces that a user may use to directly control a parameter of the local archive store, according to some embodiments. FIG. 5A illustrates a first local archive configuration interface 20 that displays user interface component 21, which is a text box that indicates to the user the current maximum size of the local archive store. If the user wishes to change the maximum size of the local email archive store, the user may select the text box and enter a different maximum local archive size. Accordingly, email archive module 9 may receive an indication that the size of the local email archive store 6 has changed and manage the storage of emails in the local email archive store accordingly. FIG. 5B illustrates a second local archive configuration interface 24 that displays user interface component 25 which is a slider interface that includes a slider 25. The user may change the maximum local archive size by moving the slider along the slider interface, as illustrated in FIG. 5B. FIG. 5C illustrates a third local archive configuration interface 27 that displays user interface component 28, which is a text box that indicates to the user the current retention period for which archived messages are stored in local email archive store 6. If the user wishes to change the retention period, the user may select the text box and enter a different retention period. In response to this change, email archive module 9 may receive an indication that the retention period has changed and manage the storage of emails in the local archive store accordingly. These are merely examples, as any suitable user interface modules may be used, such as text field, a slider, a button, etc., as the techniques described herein are not limited to any particular user interface implementation. In addition, while the user interfaces shown in FIG. 5 give the user the ability to directly control the size and/or retention period of the local archive store, alternate embodiments can allow control over other parameters as discussed above.

In some embodiments, an email search folder may be used to manage the size of the local archive store. An email search folder is virtual folder provided by an email system client that may be configured by the user to search for messages in the user's email account having user-specified criteria. To view the messages having the specified criteria, the user may select the search folder using the email client, and the messages in the search folder may be displayed in the selection interface of the email client. Applicants have appreciated that an email search folder may be used to select the criteria for messages that are to be archived in the local email archive store, based on the size of the local email archive store. For example, email archive module 9 may adjust one or more of the criteria used for the local archive store to achieve a local archive store having a target size or maximum set by the user. In some circumstances, email archive module 9 may iteratively adjust the criteria used until a suitable set of criteria are found that provides a local email archive store having the desired size. However, in some circumstances, a user may choose at least a portion of the criteria. Any suitable number and types of criteria may be used, such as the criteria discussed as above. As a result, the messages that match the criteria for the local archive store search folder may be stored in the local archive store, and appear within the search folder. However, archive messages that do not match the search folder criteria may not be stored in the local archive store. Archived messages that are not stored in the local email archive store may be retrieved from the remote email archive server.

Figure 6:
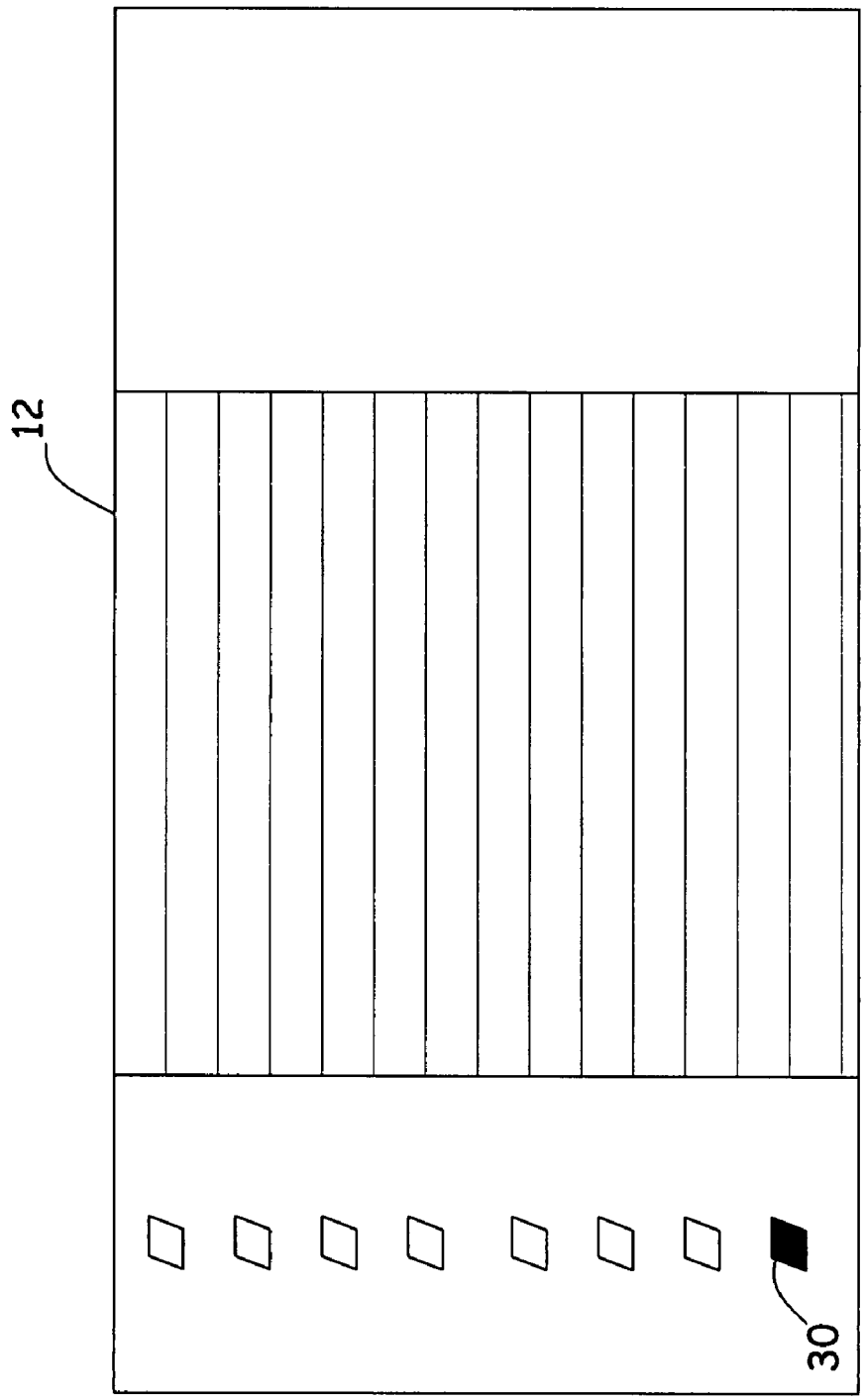
FIG. 6 illustrates the use of a search folder to manage a local email archive store, according to another embodiment.

FIG. 6 illustrates an example of a local email archive search folder 30 which has been selected by the user. In response to the selection of the local email search folder 30, selection interface 12 may display the emails that match the criteria for locally-archived emails.

In some embodiments, the user of the email account is provided with the capability to adjust one or more parameters (including size) of the local email archive store. The capability to modify these parameters may alternatively or additionally be provided to a different person (e.g., system administrator) in other embodiments.

Applicants have described some illustrative implementations to enable a user to change the size of a local email archive store. However, it should be appreciated that the techniques described herein are not limited to the above-described implementations, as any suitable implementation technique can be employed.

III. Change of an Archived Email Property in the Email System Local Store

Applicants have appreciated that various features provided by email systems for non-archived emails, (e.g., email-related reminders and email color flags) do not function properly for archived emails using prior email archive systems. For example, if a reminder is set by the user for an archived email, the reminder may not function properly so that the email client application may not remind the user to follow up in the way the user has requested. As another example, the email client application may not correctly display one or more properties associated with archived messages, such as an associated message color flag.

Applicants have appreciated that some email client applications (e.g., the OUTLOOK® email and collaboration client) rely on property information in the local client application email store 5, such an the email "stub," when implementing various email client features such as email-related reminders and color flags that rely on email properties. When changes in these properties were made to an archived email, prior email archive systems only updated the archived copy of the email (e.g., in the local archive store) and did not update the client application's local email store 5 to reflect the changes made to these properties. As a result, the properties in the local store that the email client would rely on for a feature provided by the email system (e.g., a reminder) would not be updated so that the email system would not properly implement the feature set by the user.

Figure 7:
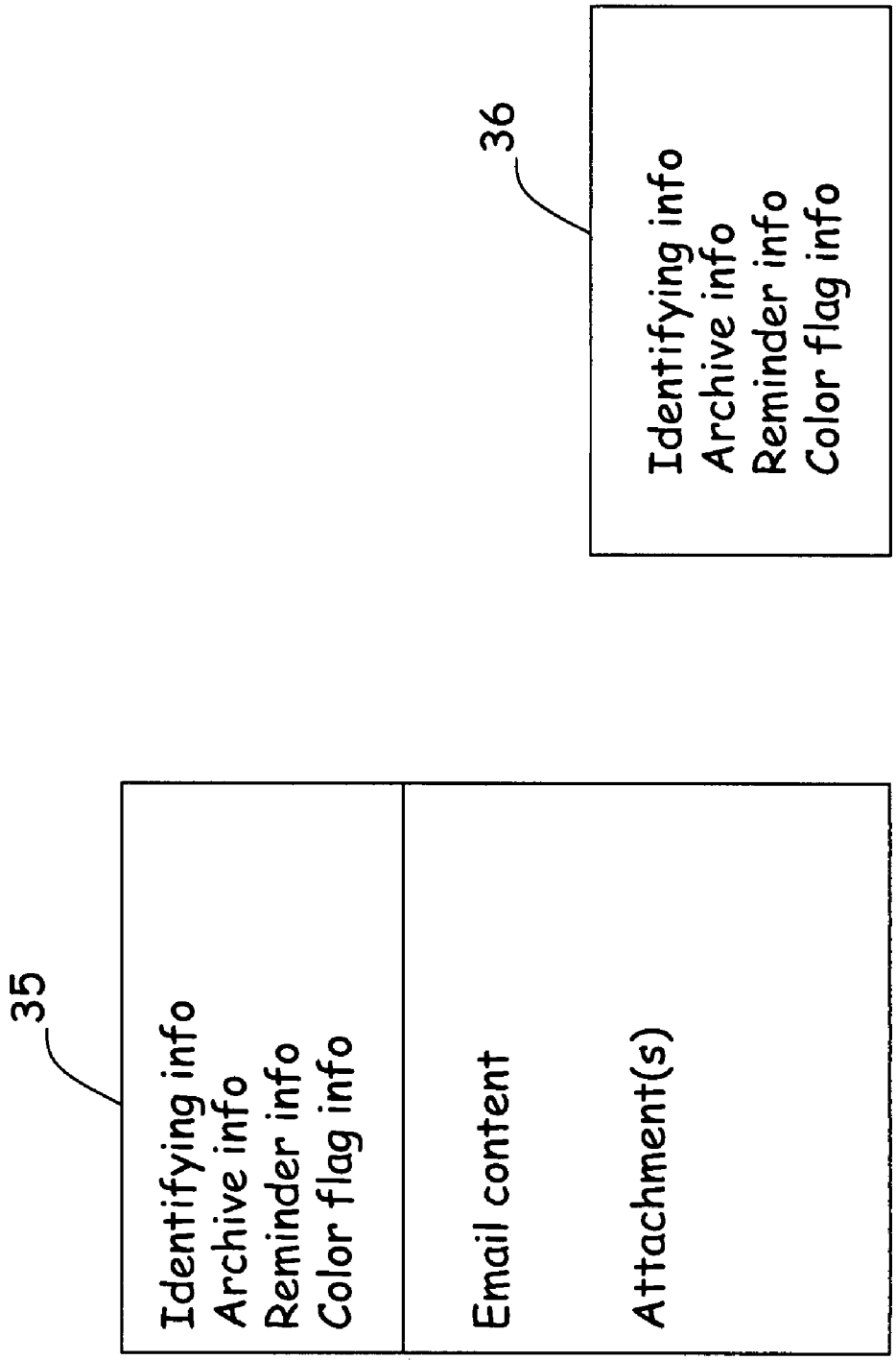
FIGS. 7A and 7B respectively illustrate an archived email and an email stub.

In accordance with some embodiments, the portion of an archived email (e.g., an email "stub") remaining in the client application's local message store is updated to reflect a change made to a property associated with an archived email message. Such updating may be performed by email archive module 9 in response to a user editing a property associated with an archived email using the email client application 8. As a result of these properties being updated in the local store for the email client, various email client application features that rely on such properties may function properly with archived emails, and the user experience with archive messages has been improved FIGS. 7A-B, respectively, illustrate an archived email 35 and an email stub 36 that remains in the email system after archival. According to one embodiment, in response to a change in a property of archived email 35, email stub 36 is updated accordingly to reflect the change in one or more property of archived email 35. As a consequence, various email client application features may function appropriately with archived emails. Some examples of the properties that may be updated have been described above (e.g., reminders and color flags) but it should be appreciated that the techniques described herein can be used to update any property made archivable by the email system.

IV. Backfilling a Local Email Archive Store

As discussed above in Section II, the techniques described herein allow a user to change the size of the local email archive store 6. If the size of the local email archive store 6 is increased, the email archive system could allow emails to slowly fill the local archive store over time as new archived emails are added and the pace of removal of archived emails from the local store slows due to the expanded size. However, Applicants have appreciated that the benefits can be achieved by not waiting for the local email archive store 6 to slowly fill with new messages, and by proactively taking advantage of the larger email archive store sooner. Applicants have developed techniques that enable automatically adding archived emails to the local archive store in response to the local archive store being increased in size, or a relaxing of the criteria used to determine which archived emails are to be stored in the local archive store.

In some embodiments, the archive system may automatically backfill the local archive store with archived emails to fill the newly expanded local archive store or with emails that match the newly expanded criteria for which emails may be stored in the local archive store. As used herein, the term "backfill" means providing the local email archive store with one or more archived emails for the remote archive server not in response to a user's request to access the archived email(s). Backfilling is not performed in response to an immediate need for the email system to access one or more archived emails. However, if a user later requests an email that was previously backfilled, the email archive system can provide the email more quickly from the local store rather than from the archive server.

In one aspect, backfilling of archived emails may be performed by email archive module 9, by sending a response to email archive server 7. Any suitable communication protocol may be used to backfill emails, such as the SOAP protocol discussed above in Section I, or any other protocol.

In one embodiment, email archive module 9 may manage the backfilling process to minimize its interference with higher priority tasks. For example, if a user requests access to a particular archived email, the backfilling process may be temporarily stopped so that the email archive system can service the user's request. As another example, backfilling of emails may be performed less during periods of low system activity (e.g., during the evening) when system resources are likely to be occupied with higher-priority tasks. However, it should be appreciated that the managing of backfill requests to minimize import or other requests need to be performed in all embodiments.

The determination of which emails will be backfilled can be performed in any way, as the techniques described herein are not limited in this respect. In one embodiment, email archive module 9 may examine the email stubs in the local email store associated with archived messages to determine which messages fit the newly expanded criteria and which are not already stored in the locally in the local email archive store 6, and the messages that match these criteria may be provided to local email archive store 6 from the archive server 7. However, other techniques are possible, including determinations made by the email archive server.

Several embodiments of archived email backfilling of a local email archive store have been described. As discussed above, backfilling of emails may result in an increased "hit" rate for archived emails in the local archive store. The retrieval of an email that was previously backfilled can be faster than if it were not and needed to be retrieved from the archive server. As a consequence, the user's experience with archived emails is improved. Although several particular backfilling implementations have been described above, the techniques described herein are not limited to these particular implementations, as others are possible.

V. Management of Email Archive Server Requests

Applicants have appreciated that numerous requests for archived emails from numerous clients in a short period of time may overload an email archive server. Such a high volume of requests may result from any of numerous circumstances. For example, if multiple users' client computers attempt to backfill (as discussed in Section IV) their local email archive stores at the same time, such requests may flood the email archive server with requests for archived emails. Email archive server 7 may not be able to handle all of these requests, which may degrade the performance of the archive system and possibly even cause it to crash.

Accordingly, Applicants have developed techniques for "backing-off" on the email archive server to manage (e.g., reducing) the rate at which requests for archived emails are sent to the email archive server. Reducing the rate at which requests are sent to the email archive server can allow the email archive server to process requests at a sustainable rate.

In one embodiment, the rate at which requests are sent to email archive server 7 may be controlled by a software module that executes on client computer 1. For example, email archive module 9 may control the rate at which requests for archived emails are sent from client computer 1 to email archive server 7. Email archive module 9 may receive information from email archive server 7 about how busy email archive server 7 currently is, and email archive module 9 may increase or decrease the rate at which it sends requests to email archive server 7 based on this information. In some circumstances, email archive module 9 may control client computer 1 to stop sending requests to email archive server 7 for any archived emails other than those required by the user of the email system.

Figure 8:
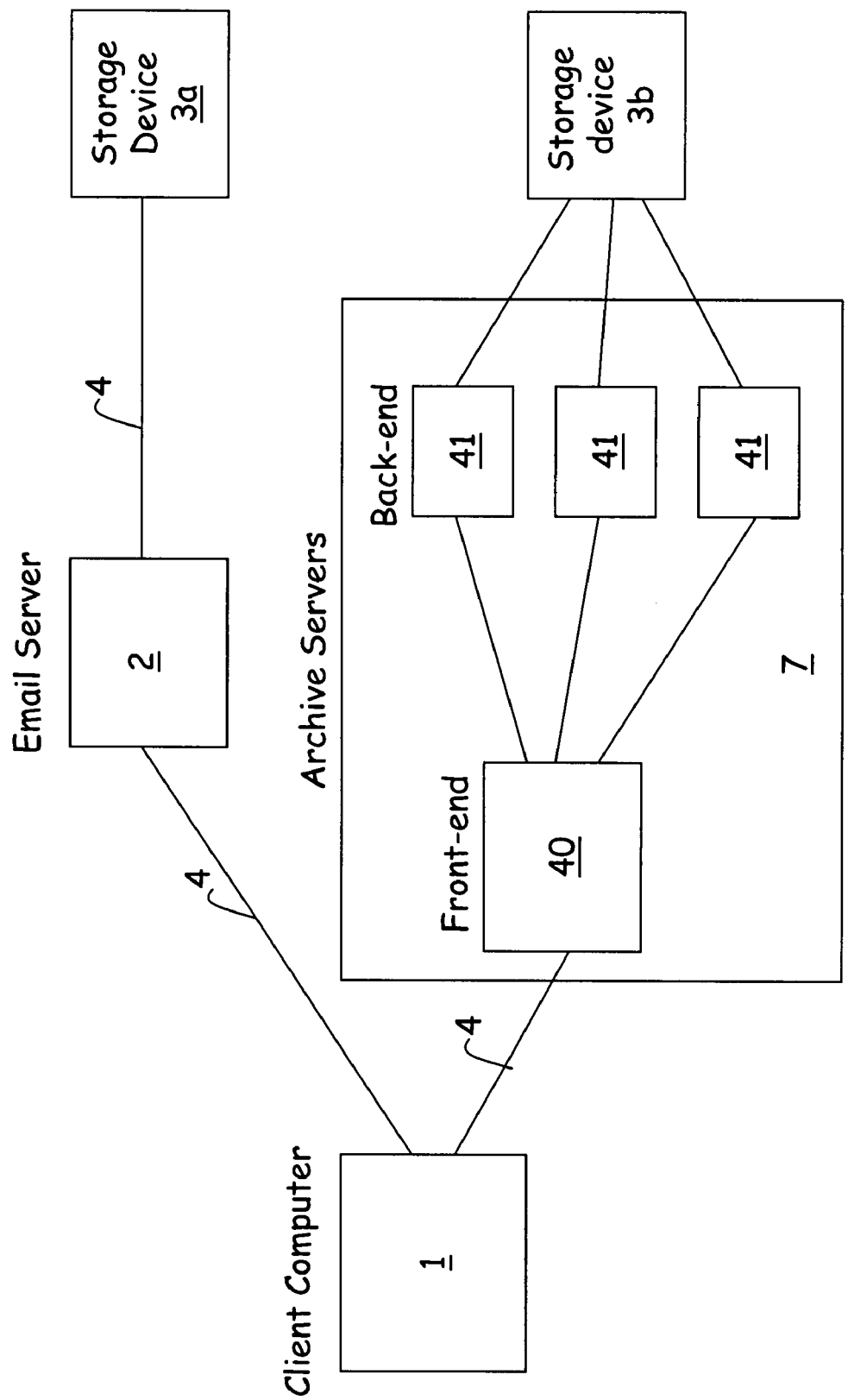
FIG. 8 is a block diagram illustrating an exemplary computer system on which any of the techniques described herein may be implemented, including front-end and back-end email archive servers.

In another embodiment, the email archive system may be implemented using a multi-level server application, with the rate at which requests are sent to an email archive server or the back end being controlled by one or more front-end servers. FIG. 8 illustrates an example of an email archive system in which email archive servers 7 are implemented by a multi-tiered server application, including at least one front-end server 40 and at least one back-end server 41. Email requests from one or more client computers may be received by front-end server(s) 40. After receiving a request, front-end server(s) 40 may provide the request to an appropriate back-end server 41, which may service the request to retrieve the archived email from email storage device 3b.

In one aspect, front-end server 40 may protect the back end servers from receiving too many requests for archived emails. As one example, front-end server 40 may communicate with one or more back-end servers 41 to monitor their states. If a back-end server 41 is unable to, take any more requests, the back-end server send a message to front end server 40 indicating this state. If a particular back-end server 41 is currently unable to handle a request, front-end server 40 may queue the email request so that it is sent to back-end server 41 at a later time. Front-end server 40 may maintain a queue of all pending email requests to be forwarded by front-end server 40, temporarily storing these requests locally on front-end server 40 until they can be forwarded to a back-end server 41 for servicing. Front-end server 40 may stop sending that particular back-end server 41 any requests for a predetermined period of time. Alternatively, front-end server may resume sending requests to back-end server 41 after receiving a message from back-end server 41 indicating that front-end server 40 may resume sending requests.

The number of requests that can be sent to a back-end server 41 and/or the decision as to whether to back-off on the back-end server may be determined based on any suitable criteria. For example, front-end server(s) 40 may keep track of the number of requests sent to a back-end server 41 to ensure that the number of requests that the back-end server 41 receives in a given time period does not exceed a pre-selected threshold. As another example, front-end server 40 may receive an indication from back-end server 41 telling front-end server 40 to back off. Such an indication may be in the form of a HTTP 503 "busy error," for example. However, it should be appreciated that a variety of alternative implementations will readily occur to one of ordinary skill in the art.

As mentioned above, each tier in the multi-tiered server applications can have any number of servers (e.g., from one to many). In addition, it should be appreciated that the multi-tiered architecture is not limited to only two tiers, and may include three or more tiers, when each front end tier can regulate the flow of requests to the tier behind it.

VI. Email Archive Server Priming for a Content Request

As discussed above, the email archive system may include multiple archive servers. Section V and FIG. 8 illustrate one such arrangement in a multi-tiered system. However, multiple servers may be provided in a single tiered system as well. In systems with one or more servers that directly communicate with the storage for the email archive system (e.g., storage system 36 in FIG. 1), whether back-end server(s) 41 that are fronted by one or more front end servers or a single tiered system, each such server may be responsible for servicing requests for different groups of emails. The groups may be designed in any way to spread the load among the available servers. In response to a request to retrieve an archived email, the archived email server configuration should employ some technique for determining which server should handle the request and retrieve it from storage. This can be accomplished in any suitable way.

In embodiments that employ one or more front-end servers, the front-end servers can make the determination of which back-end server is the one that is responsible for retrieval of a requested email. This can be done in any suitable way. In accordance with one embodiment, the front-end servers can maintain metadata that identifies, for each archived email, the appropriate back-end server, so that when a request for an archived email is received, the metadata can be consulted and the request forwarded to the appropriate back-end server. In configurations that employ a single-tier configuration, one or more of the servers can be configured to receive access requests for archived emails, can maintain such metadata and can forward the request to the appropriate server for processing.

In an alternate technique, the maintenance of metadata identifying the appropriate server for each archived email can be eliminated by employing a querying technique, such that when a request is received by one of the servers in the email archive system (e.g., a front-end server in a multi-tiered architecture or one of the servers in a single-tier architecture), the server that receives the request can query the servers directly responsible for retrieving archived emails to determine which of them should process the request. Each server responsible for managing the archiving of a subset of the archived emails can determine whether it is responsible for the requested email in any suitable manner. For example, each server can maintain metadata of the emails that it has archived. Alternatively, a rule-based system can be employed that can be automatically applied to each email based upon some identifying information therein to automatically distribute archived emails across the servers that interact with the archive storage, and the rule can be applied to a request to retrieve an archived email to determine the appropriate email server.

While both of the above-described techniques can be employed in accordance with some embodiments of the present invention, as well as any suitable technique for distributing and receiving archived emails amongst a plurality of archive servers, Applicants have developed a technique that provides some advantages over those implementations by removing the requirement that the archive servers store an exhaustive list of metadata identifying where each archived email is stored and by reducing the querying to locate a requested archived email. In this respect, in one embodiment, the client computer 1 may "prime" the archive servers by sending information identifying a "candidate" server (e.g., a back-end server 41) that is likely to be responsible for processing the request. Once the archive servers (e.g., a front-end server 40) receive the request and the information about the candidate back-end server 41, the archive servers may attempt to service the request from the candidate back-end server 41 and avoid the need for grouping to identify the appropriate server, unless the candidate server does not manage the requested email.

The candidate server may be chosen by email archive module 9 in any suitable way. In one embodiment, emails that are logically related (e.g., belonging to the same user account) may be stored to archive storage by a same archive server (e.g., a back-end server in a multi-tiered arrangement or one of the servers in a single-tier arrangement). Thus, in one embodiment, the email archive module chooses the candidate server to be the server that serviced a previous email request for the same user. For example, the candidate server chosen may be the server that processes the most recent request from archive and from the same user. Alternatively, the candidate server may be chosen to be the server that most frequently processes the requests for that user. Although particular techniques have been described for selecting the identity of the "candidate" server, it should be appreciated that the candidate server may be chosen in any suitable way.

Techniques have been described that enable sending a request for an archived email that identifies a "candidate" server, which may provide faster response times for requests and reduce system processing overhead. As discussed above, although these techniques have been described in the context of an email archive system that includes both front-end and back-end email archive servers, it should be appreciated that the techniques described herein are not limited to an archive server configuration having both front-end and back-end servers, and can alternatively be used in a system with only a single level of servers.

VII. Email Content Pre-Caching to a Local Archive Store

Several techniques have been discussed above for providing archived emails to a local email archive store from a remote archive server. For example, the local email archive store may be "backfilled" with archived emails from the archive server when the size of the local email archive store is expanded in size, as discussed above in Section IV. Backfilling of emails may require transferring the emails (e.g., over a network) from the email archive server 7. Applicants have appreciated that in some circumstances, it may be desirable to avoid transferring emails from the archive server 7 to the local store, as the archive system could act more efficiently by avoiding some of such transfers. In this respect, Applicants have further recognized that archived emails are available locally in the client application email store prior to being archived, and that techniques can be developed to leverage the local availability of an email prior to being archived to reduce the volume of archived emails transferred from the archive server to the local archive store.

In some embodiments, one or more emails may be "pre-cached," or saved to the local email archive store in anticipation that the email eventually will be archived. The email archive store may recognize that an email stored locally in client application email store 5 which eventually will be archived in any suitable way. Thus, rather than waiting until the contents of the email are deleted from the client application email store 5 so that placing the archived email in the local archive store would require retrieval from the archive server, the email may be saved in the local email archive store 6 prior to being removed the local email store. For example, the email may be copied from the client application email store 5 to the local archive email store 6 prior to the archiving of the email. Thus, the email may be locally available in local email archive store 6 when, or as, the email is archived. Thus, if the user later seeks to access the archived email, it can be accessed from the local archive store without requiring a transfer from the email archive server.

Pre-caching may be performed for some or all of a user's emails. Any suitable criteria may be used for determining which emails are to be pre-cached, and when they are to be pre-cached. In one example, all emails may be pre-cached some specified time period (e.g., a day, an hour, etc.) before they are set to be archived. In another example, only emails that meet criteria (e.g., have attachments, are of a specified size, etc.) may be pre-cached into the local archive store. These functions may be performed by the email archive module 9, or any other suitable component. In some embodiments, email archive module 9 may establish the policy for which emails are to be pre-cached and when.

VIII. Prioritizing Archived Email Requests

Several different circumstances have been discussed above in which one or more archived emails may be provided to client computer 1 from the archive server. One example is when a user seeks to open an archived email that is not available in the local email archive store 6. To obtain the requested email, the local component of the email archive system executing on the user's computer may communicate with email archive server 7 to request the email, which may be sent to client computer 1 in response to receiving the request. Another example is the "backfilling" of a client computer's local email archive store 6, as discussed in Section IV, from the email archive server 7.

Applicants have appreciated that different types of requests for archived content may have different degrees of urgency. Accordingly, in some embodiments, requests for archived emails and/or archived email content may be prioritized and serviced based on their priority. For example, a request from a user to open a particular email or email attachment may be given a relatively high priority, while a request to backfill the local email archive store for a client computer may be given a relatively lower priority. As a result, the user experience can be improved because higher priority tasks (e.g., responding to a user's request to open an email or email attachment) can be elevated in precedence over lower priority tasks and therefore be processed more quickly.

Email archive module 9 may control the sending of requests for archived emails from client computer 1 to email archive server(s) 7. In one embodiment, a request for an archived email may include information indicating the level of priority that the request should be accorded by the email archive servers, either directly or indirectly by identifying the nature of the request (e.g., user based versus backfilling). For example, a user's request for an email may be given the highest priority of one, while a backfill request may be given a lower priority of two. It should be appreciated that any suitable number of levels of priority may be used, as the techniques described herein are not limited as to the number of priority levels used, nor to the types of requests that can be assigned different priority levels.

In some embodiments, email archive server(s) 7 may recognize the priority level of the request (either directly or through interpreting information about the request) when the request is received. In response to determining the priority level of a request, an email archive server 7 may process the request corresponding to its priority level. For example, if the archive server(s) have a queue for received requests, newly received priority level one requests may be placed in a higher priority place in the queue than newly received priority level two requests. If email archive servers 7 include one or more front-end and back-end servers (as discussed in further detail above), the front-end server may perform the queuing function, and forward the requests to the back-end servers in the appropriate order according their priority.

IX. Further Applications and Example Computer System

Although the techniques described herein are primarily discussed in the context of an email archive system, any of these techniques may be used in other suitable applications. As one example, the techniques described herein may be used for local archiving of documents in a computer system having a document management system that uses a document server for managing the storage of documents. Document servers enable storing documents in such a way that a plurality of users can access a document. The techniques described herein may be used for document management in similar manner as described above with respect to email archive systems. Documents may be locally archived on a user's device, enabling increased document availability and decreased system cost. One or more suitable modifications may be desired with respect to an email archive system, such as enabling support for a concurrency control system to make sure that only one user can make changes to a document at a time.

In some implementations, a document management system may be integrated with a email message system. For example, a email client application may provide a suitable user interface that allows a user to access documents through the document management system. One example of a suitable document management system may include the SHAREPOINT® team services system available from Microsoft Corporation. However, any suitable document management system may be used.

It should be appreciated that the techniques described herein may be used in any of a variety of applications, not limited to email archive systems or document management systems. Also, the techniques described herein may be implemented in any suitable hardware and/or software, some examples of with are described with respect to FIG. 9

Figure 9:
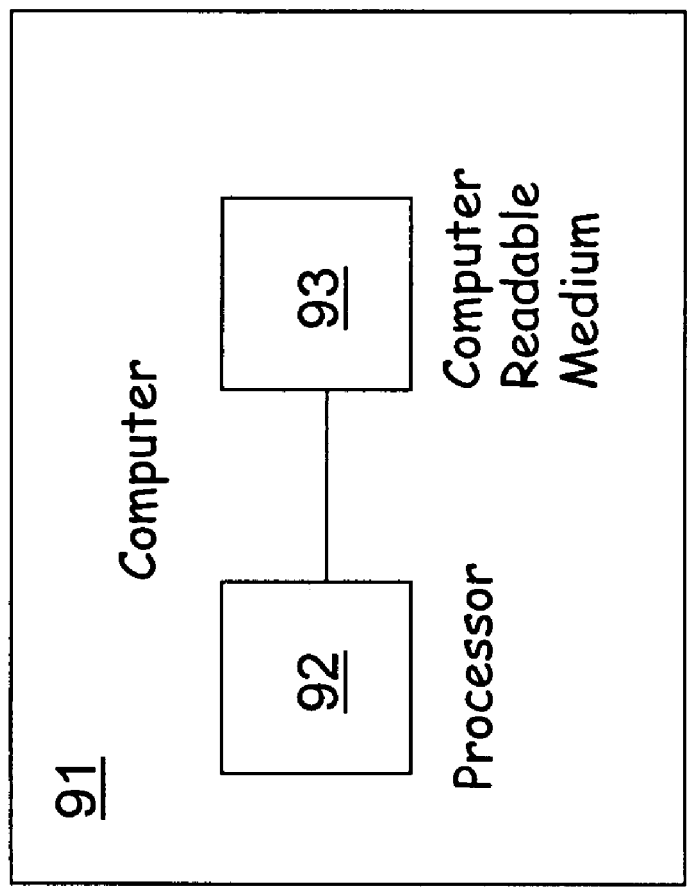
FIG. 9 is a block diagram illustrating an example of a computer on which embodiments may be implemented.

FIG. 9 is a block diagram illustrating an example of a computer 91 on which embodiments may be implemented. Computer 91 may be suitable to function as one or more of client computer 1, email server 2 and email archive server 7, for example. It should be appreciated that the above-described embodiments can be implemented in any of numerous ways. The embodiments may be implemented using hardware, software or a combination thereof. When implemented in software, the software code can be executed on any suitable processor 92 or collection of processors, whether provided in a single computer 91 or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present techniques described herein comprises at least one computer-readable medium 93 (e.g., a computer memory, a floppy disk, a compact disk, a tape, etc.) encoded with a computer program (i.e., a plurality of instructions), which, when executed on a processor (e.g., processor 92), performs the above-discussed functions of the embodiments of the present invention. The computer-readable medium 93 can be transportable such that the program stored thereon can be loaded onto any computer environment resource to implement one or more embodiment(s). In addition, it should be appreciated that the reference to a computer program which, when executed, performs the above-discussed functions, is not limited to an application program running on a host computer. Rather, the term computer program is used herein in a generic sense to reference any type of computer code that can be employed to program a processor to implement the above-discussed aspects of the present invention.

It should be appreciated that in accordance with several embodiments wherein processes are implemented in a computer readable medium 93, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The techniques described herein are limited only as defined by the following claims and the equivalents thereto.

What is claimed is:

1. A method for use in a computer system comprising an email message system that manages a plurality of email messages and an email archive system, wherein the email archive system archives at least some of the plurality of email messages and replaces at least a portion of an archived email message in the email message system with a short cut identifier, wherein the email message system comprises an email message server and at least one email message client, wherein the email message system supports creation of user email accounts, wherein the email message client executes on a client computer that a user of the client computer having an email account operates to manage the user's email messages accessible via the user's email account, the user's email messages comprising at least a portion of the plurality of email messages, wherein the email archive system comprises a local archive store on the client computer that stores at least some of the user's archived email messages, the local archive store having a size that is configurable, the method comprising:

(A) in response to the size of the local archive store being expanded to include additional storage capacity, backfilling the local archive with at least one of the user's archived email messages not previously stored in the local archive store before the size of the local archive store was expanded.

2. The method of claim 1, wherein (A) comprises backfilling the local archive store with a group of the user's archived email messages not previously stored in the local archive store before the size of the local archive store was expanded, wherein the group substantially fills the additional storage capacity.

3. The method of claim 1, wherein the local archive store size is configurable by the user of the email account, and wherein (A) comprises back-filling the local archive store in response to the size of the local archive store being expanded by the user of the email account.

4. The method of claim 1, further comprising:
(B) prior to (A), providing a user interface enabling a user to change at least one property of the local archive store.

5. The method of claim 4, wherein (A) is performed in response to receiving user input via the user interface.

6. The method of claim 1, further comprising:
(B) selecting at least one criteria for archived email messages to be backfilled, the at least one criteria applying to the at least one of the user's archived email messages.

7. The method of claim 6, wherein the at least one criteria is selected such that the local archive store is backfilled with a group of the user's archived email messages not previously stored in the local archive store before the size of the local archive store was expanded, wherein the group substantially fills the additional storage capacity.

8. At least one computer readable storage medium encoded with a plurality of instructions that, when executed, perform a method for use in a computer system comprising an email message system that manages a plurality of email messages and an email archive system, wherein the email archive system archives at least some of the plurality of email messages and replaces at least a portion of an archived email message in the email message system with a short cut identifier, wherein the email message system comprises an email message server and at least one email message client, wherein the email message system supports creation of user email accounts, wherein the email message client executes on a client computer that a user of the client computer having an email account operates to manage the user's email messages accessible via the user's email account, the user's email messages comprising at least a portion of the plurality of email messages, wherein the email archive system comprises a local archive store on the client computer that stores at least some of the user's archived email messages, the local archive store having a size that is configurable, the method comprising:
(A) in response to the size of the local archive store being expanded to include additional storage capacity, back-filling the local archive with at least one of the user's archived email messages not previously stored in the local archive store before the size of the local archive store was expanded.

9. The at least one computer readable storage medium of claim 8, wherein (A) comprises back-filling the local archive store with a group of the user's archived email messages not previously stored in the local archive store before the size of the local archive store was expanded, wherein the group substantially fills the additional storage capacity.

10. The at least one computer readable storage medium of claim 8, wherein the local archive store size is configurable by the user of the email account, and wherein (A) comprises back-filling the local archive store in response to the size of the local archive store being expanded by the user of the email account.

11. The at least one computer readable storage medium of claim 8, further comprising:
(B) prior to (A), providing a user interface enabling a user to change at least one property of the local archive store.

12. The at least one computer readable storage medium of claim 11, wherein (A) is performed in response to receiving user input via the user interface.

13. The at least one computer readable storage medium of claim 8, further comprising:
(B) selecting at least one criteria for archived email messages to be backfilled, the at least one criteria applying to the at least one of the user's archived email messages.

14. The at least one computer readable storage medium of claim 13, wherein the at least one criteria is selected such that the local archive store is backfilled with a group of the user's archived email messages not previously stored in the local archive store before the size of the local archive store was expanded, wherein the group substantially fills the additional storage capacity.

15. An email archive system for use in a computer system comprising an email message system that manages a plurality of email messages, the email message system comprising an email message server and at least one email message client, wherein the email message system supports creation of user email accounts, wherein the email message client executes on a client computer that a user of the client computer having an email account operates to manage the user's email messages accessible via the user's email account, the user's email messages comprising at least a portion of the plurality of email messages, the email archive system comprising:
at least one archive server that archives at least some of the plurality of email messages and replaces at least a portion of an archived email message in the email message system with a short cut identifier; and
at least one archive client that executes on the client computer and that comprises a local archive store that stores at least some of the user's archived email messages, the local archive store having a size that is configurable;
wherein in response to the size of the local archive store being expanded to include additional storage capacity, the email archive system back-fills the local archive with at least one of the user's archived email messages not previously stored in the local archive store before the size of the local archive store was expanded.

16. The email archive system of claim 15, wherein the email archive system backfills the local archive store with a group of the user's archived email messages not previously stored in the local archive store before the size of the local archive store was expanded, wherein the group substantially fills the additional storage capacity.

17. The email archive system of claim 15, wherein the local archive store size is configurable by the user of the email account, and wherein the email archive system back-fills the local archive store in response to the size of the local archive store being expanded by the user of the email account.

18. The email archive system of claim 15, wherein the email archive system comprises means for, in response to the size of the local archive store being expanded to include additional storage capacity, back-filling the local archive with at least one of the user's archived email messages not previously stored in the local archive store before the size of the local archive store was expanded.

19. The email archive system of claim 15, further comprising:
an email archive module that executes on the client computer;
wherein the email archive module controls the back-filling of the local archive store in response to determining that the local archive store has been expanded.

20. The email archive system of claim 19, wherein the email archive module controls sending, by the client computer, at least one request to the archive server for the at least one of the user's archived email messages.

* * * * *